Figure 1:
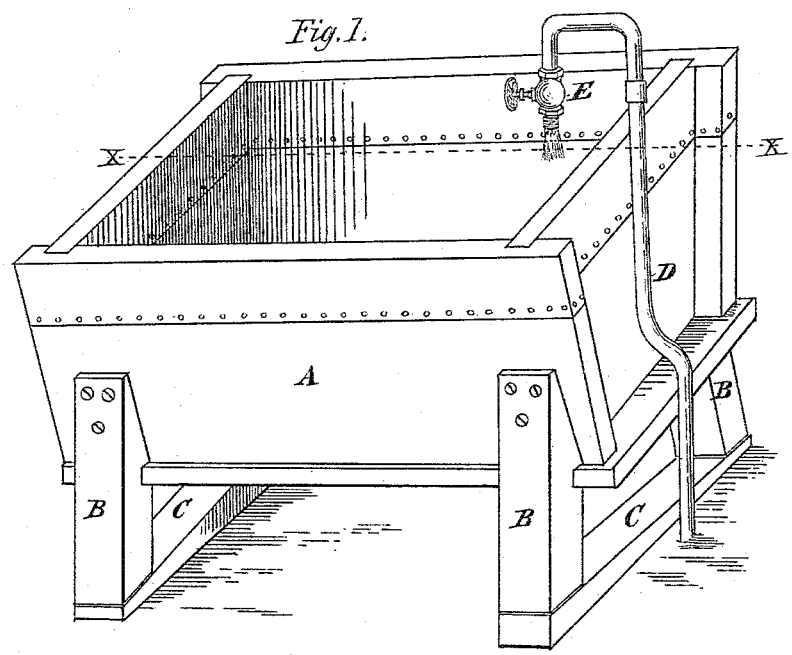

(No Model.)

2 Sheets—Sheet 1.

A. HAUSMAN.
WATERING STAND.

No. 380,570. Patented Apr. 3, 1888.

WITNESSES.
Frank Pardon.
George Hammer.

INVENTOR.
Athanasius Hausman.
by J. G. Hewitt.
Attorney.

(No Model.) 2 Sheets—Sheet 2.

A. HAUSMAN.
WATERING STAND.

No. 380,570. Patented Apr. 3, 1888.

WITNESSES
C. Keller.
H. Diel.

INVENTOR
Athanasius Hausman
by Chas. C. Roe,
atty.

United States Patent Office.

ATHANASIUS HAUSMAN, OF LOUISVILLE, KENTUCKY.

WATERING-STAND.

SPECIFICATION forming part of Letters Patent No. 380,570, dated April 3, 1888.

Application filed March 24, 1887. Serial No. 234,444. (No model.)

*To all whom it may concern:*

Be it known that I, ATHANASIUS HAUSMAN, a citizen of the United States, residing at Louisville, in the county of Jefferson and State of Kentucky, have invented a certain new and useful Improvement in Watering-Stands; and I do hereby declare that the following is a full, clear, and exact description of the construction and operation of the same, reference being had to the accompanying drawings, forming part of this specification.

This my invention relates to certain new and useful improvements in adjustable watering-stands for the use of farmers, tavern-keepers, stock-raisers, and others in watering their stock, and for other similar purposes, consisting in a reservoir or trough, made of wood, of the required size and length, with the inner and outer surface of the top edges of the sides and ends lined with sheet metal about six inches below the top, with the lower part secured so as to be water-tight, with legs at the corners secured to the sides of the trough, and is further provided with a pivot-post in the center of the bottom, upon which the whole device rests, and upon which it turns when necessary in watering stock through a fence without having the trough on the outside.

The object of this my invention is to provide a watering stand or trough for watering stock that will be cheap, convenient in use, and save much time and trouble when water is out of the reach of stock and a trough has to be resorted to and supplied by means of the hydrant-pipe or otherwise, either on the inside or outside of the fence, or on the sidewalk of city streets.

I attain the above object by the mechanism illustrated in the drawings, in which—

Figure 2:
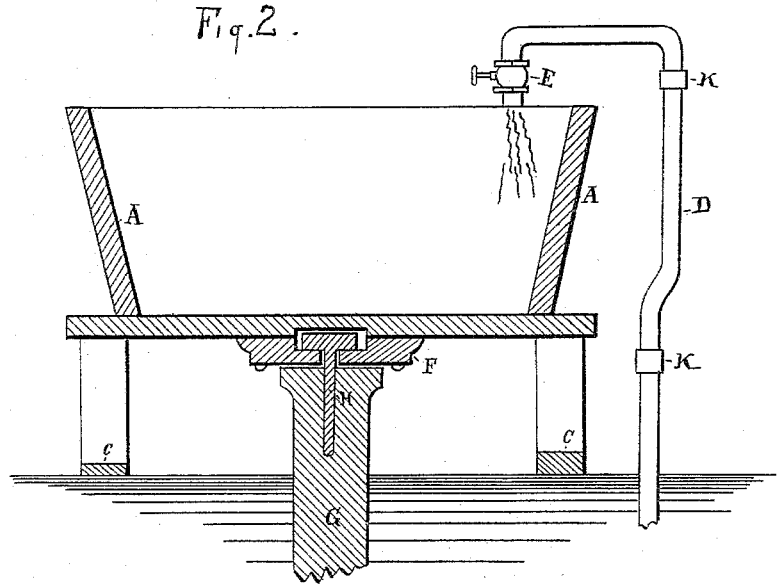

Figure 1 is a perspective view of the reservoir or trough, showing its general construction. Fig. 2 is a sectional view on the line *x x* of Fig. 1.

Similar letters refer to similar parts throughout the several views.

In the drawings, A represents the trough, which is made of wood, and in form as shown in the drawings, with the top part lined with sheet metal for about six or more inches below the top. B B are the legs, which are cut over the edges of the bottom and secured to the sides by means of screw-bolts, so as to stand out at the bottom. C C are square pieces of wood sunk in the ground so as to form incline planes in opposite directions, to answer as a rest for the legs B B, to steady the trough when in use, and by means of the incline plane pieces in opposite directions it may be easily turned on the pivot-post G, upon which it will rest when turned off the incline plane pieces. H is the pivot-bolt which holds the trough in place, and F is the washer-board upon which it turns, all of which are made in form as shown in the drawings.

D is the water-supply pipe and faucet. The manner in which the trough is rotated will be clear.

In Fig. 2, letter K shows a joint which allows the upper portion of the supply-pipe D to be turned around when the trough A is to be used.

Therefore, what I claim as my invention, and desire to secure by Letters Patent in watering-stands, is—

The combination of the reservoir or trough A, having legs B B, incline plane pieces C C, and supply-pipe D, as above described, in combination with the pivot-post G, bolt H, and washer-board F, substantially as described, and for the purpose set forth.

ATHANASIUS HAUSMAN.

Witnesses:
FRANK PARDON,
GEORGE HAMMER.